United States Patent
Arao et al.

(10) Patent No.: US 8,451,982 B2
(45) Date of Patent: May 28, 2013

(54) NOTIFICATION APPARATUS, NOTIFICATION SYSTEM, METHOD OF OPERATING NOTIFICATION APPARATUS, AND PROGRAM FOR NOTIFICATION APPARATUS

(75) Inventors: Shinya Arao, Tokyo (JP); Teruharu Serada, Tokyo (JP); Hirokazu Yamada, Tokyo (JP); Noriaki Hayase, Tokyo (JP); Takayuki Omino, Tokyo (JP); Yasuaki Tsunemi, Tokyo (JP); Kenichi Kamiya, Tokyo (JP); Michio Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 969 days.

(21) Appl. No.: 12/498,139

(22) Filed: Jul. 6, 2009

(65) Prior Publication Data

US 2010/0008478 A1    Jan. 14, 2010

(30) Foreign Application Priority Data

Jul. 11, 2008   (JP) .................................. 2008-181028

(51) Int. Cl.
*H04M 11/04* (2006.01)
(52) U.S. Cl.
USPC ........................................ 379/37; 379/88.02
(58) Field of Classification Search
USPC .......................................................... 379/37
See application file for complete search history.

(56) References Cited

U.S. PATENT DOCUMENTS

| | | | | |
|---|---|---|---|---|
| 5,946,386 | A | * 8/1999 | Rogers et al. | 379/265.09 |
| 7,068,760 | B2 | * 6/2006 | Binning | 379/45 |
| 7,529,850 | B2 | * 5/2009 | Verma et al. | 709/242 |
| 7,813,750 | B2 | * 10/2010 | Hobby et al. | 455/521 |

FOREIGN PATENT DOCUMENTS

| | | |
|---|---|---|
| JP | 2000-341431 A | 12/2000 |
| JP | 2002133559 A | 5/2002 |
| JP | 03030505 A | 4/2003 |
| JP | 2003114920 A | 4/2003 |
| JP | 2004032042 A | 1/2004 |
| JP | 2004040396 A | 2/2004 |
| JP | 2006338372 A | 12/2006 |

OTHER PUBLICATIONS

M. Moh et al., "Mobile IP Telephony: Mobility Support of SIP", Proceedings of the International Conference on ComputerCommunications and Networks, Oct. 11, 1999, pp. 554-559, XP002143545.

Japanese Office Action for JP2008-181028 mailed on Nov. 13, 2012.

* cited by examiner

*Primary Examiner* — Simon Sing

(57) ABSTRACT

A management apparatus of a notification system includes an interface unit that communicates with a store terminal used for a predetermined site work process by a site worker and an IP telephone terminal used for IP phone call, which are located at one work site; an accepting unit that accepts an emergency notification to the site worker; a display control unit that displays and outputs the accepted emergency notification on the store terminal via the interface unit; and a calling unit that calls the IP telephone terminal via the interface unit to make the site worker recognize the emergency notification.

18 Claims, 6 Drawing Sheets

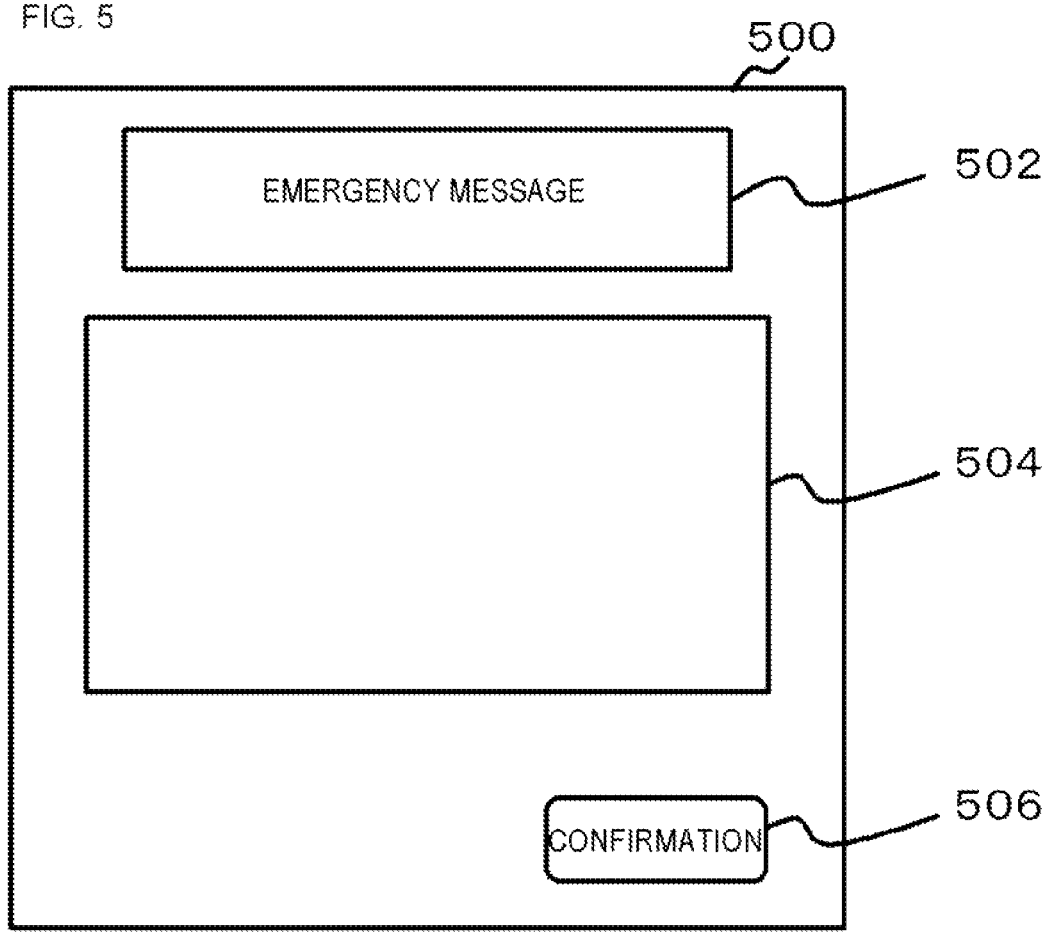

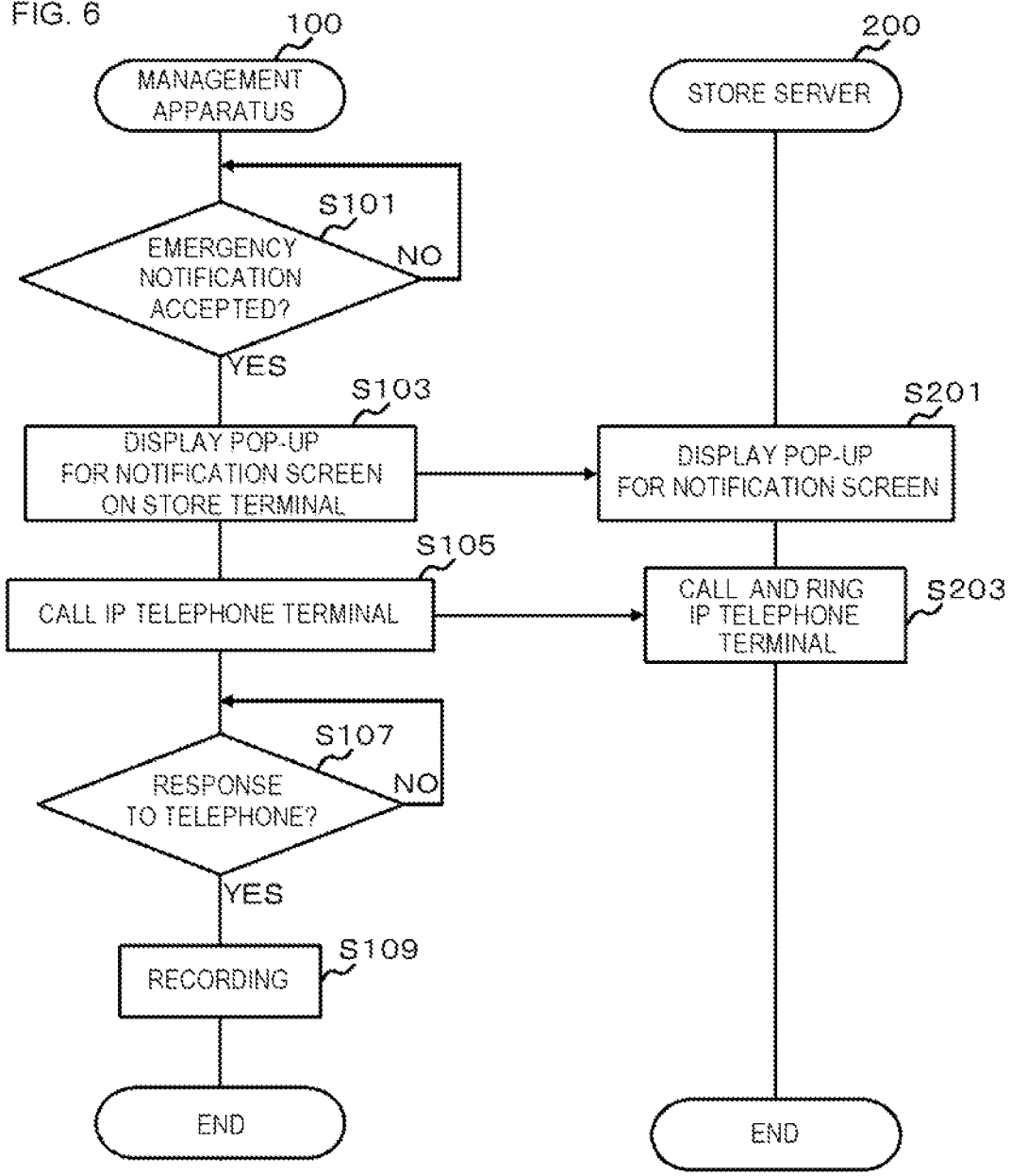

NOTIFICATION APPARATUS, NOTIFICATION SYSTEM, METHOD OF OPERATING NOTIFICATION APPARATUS, AND PROGRAM FOR NOTIFICATION APPARATUS

This application is based upon and claims the benefit of priority from Japanese patent application No. 2008-181028, filed on Jul. 11, 2008, the disclosure of which is incorporated herein in its entirety by reference.

BACKGROUND

1. Technical Field

The present invention relates to a notification apparatus, a notification system, a method of operating a notification apparatus, and a program for notification apparatus, and more particularly to a notification apparatus, a notification system, a method of operating a notification apparatus, and a program for notification apparatus that report an emergency to a terminal located at a work site.

2. Related Art

It is described that confirmation of opening is made when a notification of a message having a high emergency is transmitted to an addressee in Japanese Laid-open patent publication No. 2000-341431, for example.

For example, when a need for emergency notification to a plurality of stores occurs, in a system that performs pop-up display of an emergency notification message on a screen of a POS terminal of the stores, the confirmation by opening of the message can be managed out by the system. However, there may be a danger in that the store side does not notice the message, causing a delay of the opening of the message of emergency.

An exemplary object of the invention is to provide a notification apparatus, a notification system, a method of operating a notification apparatus, and a program for a notification apparatus that can make the site workers notice the emergency notification promptly and with certainty.

SUMMARY

A notification apparatus according to an exemplary aspect of the invention includes:

a terminal communication unit that communicates with an information processing terminal used for a predetermined site work process by a site worker and an Internet Protocol (IP) telephone terminal used for IP phone call, which are located at one work site;

an accepting unit that accepts an emergency notification to the site worker;

an emergency displaying unit that displays and outputs the accepted emergency notification on the information processing terminal via the terminal communication unit; and an emergency calling unit that calls the IP telephone terminal via the terminal communication unit to make the site worker recognize the emergency notification.

A notification system according to an exemplary aspect of the invention includes:

an information processing terminal that is located at a work site and used for a predetermined site work process by a site worker;

an IP telephone terminal that is located at the work site and used for IP phone call; and a management apparatus that is connected to the information processing terminal and the IP telephone terminal via a network, wherein the information processing terminal includes:
a communication unit that communicates with the management apparatus via the network; and
a displaying unit that performs display processing controlled by the management apparatus via the communication unit, the IP telephone terminal includes:
a communication unit that communicates with the management apparatus via the network; and
a ringing unit that receives a call from the management apparatus via the communication unit, and sounds the ring tone, and the management apparatus includes:
a communication unit that communicates with the information processing terminal and the IP telephone terminal via the network;
an accepting unit that accepts an emergency notification to the site worker;
an emergency displaying unit that communicates with the information processing terminal via the communication unit and allows the emergency notification accepted by the accepting unit to be displayed and output on the displaying unit of the information processing terminal; and
an emergency calling unit that communicates with the information processing terminal via the communication unit and calls the IP telephone terminal thereby making the site worker recognize the emergency notification.

A method of operating a notification apparatus according to an exemplary aspect of the invention that communicates with an information processing terminal used for a predetermined site work process by a site worker and an IP telephone terminal used for IP phone call, which are located at one work site, includes:

making the notification apparatus accept an emergency notification to the site worker;
making the notification apparatus display and output the accepted emergency notification on the information processing terminal; and
making the notification apparatus call the IP telephone terminal to make the site worker recognize the emergency notification.

A program according to an exemplary aspect of the invention allows a computer to realize a notification apparatus that communicates with an information processing terminal used for a predetermined site work process by a site worker and an IP telephone terminal used for IP phone call, which are located at one work site, wherein the program allows the computer to execute:

a reception procedure by which the notification apparatus accepts an emergency notification to the site worker;
an emergency displaying procedure by which the notification apparatus displays and outputs the accepted emergency notification on the information processing terminal; and
an emergency calling procedure by which the notification apparatus calls the IP telephone terminal to make the site worker recognize the emergency notification.

Here, any combination of the above-described constituent elements as well as conversion of the expression of the present invention among methods, apparatuses, systems, recordation media, computer programs, and others is also effective as a mode of the present invention.

Also, various constituent elements of the present invention need not necessarily be individually independent, and there may be a case in which a plurality of constituent elements are formed into one member, a case in which one constituent element is formed with a plurality of members, a case in which one constituent element is a part of another constituent element, a case in which the a part of one constituent element and a part of another constituent element overlap with each other, and the like cases.

Though the method and the computer program of the present invention recite a plurality of procedures in order, the order of description does not limit the order of execution of the plurality of procedures. For this reason, in executing the method and the computer program of the present invention, the order of the plurality of procedures can be changed within a range that does not deteriorate the scope of the present invention.

Also, the plurality of procedures of the method and the computer program of the present invention are not limited to being executed at timings that are individually different from each other. For this reason, there may be a case in which another procedure is performed while a certain procedure is being executed, a case in which an execution timing of a certain procedure and an execution timing of another procedure are partly or wholly overlapped with each other, and the like cases.

According to the present invention, there are provided a notification apparatus, a notification system, a method of operating a notification apparatus, and a program for notification apparatus that can make the site worker notice the emergency notification promptly and with certainty.

BRIEF DESCRIPTION OF THE DRAWINGS

The above and other objects, advantages, and features of the present invention will be more apparent from the following description of certain preferred exemplary embodiments taken in conjunction with the accompanying drawings, in which:

FIG. 5 is a view illustrating an example of an emergency notification screen that is displayed on a touch panel of the store terminal of the notification system shown in FIG. 1; and FIG. 6 is a flowchart showing an example of an operation of the notification system of the present exemplary embodiment.

DETAILED DESCRIPTION

Figure 1:
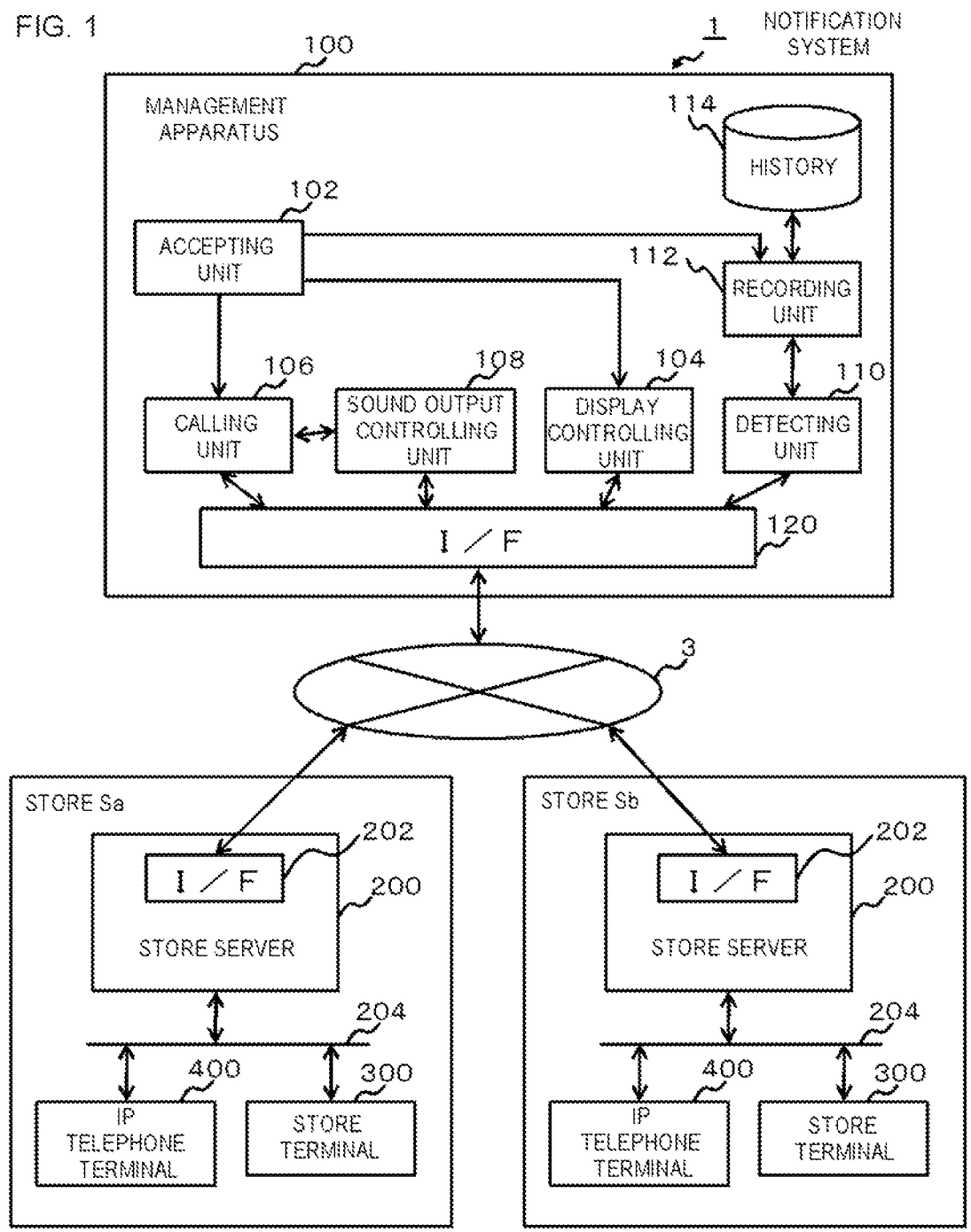
FIG. 1 is a functional block diagram illustrating a construction of a notification system according to an exemplary embodiment of the present invention.

The invention will now be described herein with reference to illustrative exemplary embodiments. Those skilled in the art will recognize that many alternative exemplary embodiments can be accomplished using the teachings of the present invention and that the invention is not limited to the exemplary embodiments illustrated for explanatory purposes.

Here, in all of the drawings, like constituent elements will be denoted with like reference numerals, and the description thereof will not be repeated.

FIG. 1 is a functional block diagram illustrating a construction of a notification system 1 according to an exemplary embodiment of the present invention.

Figure 2:
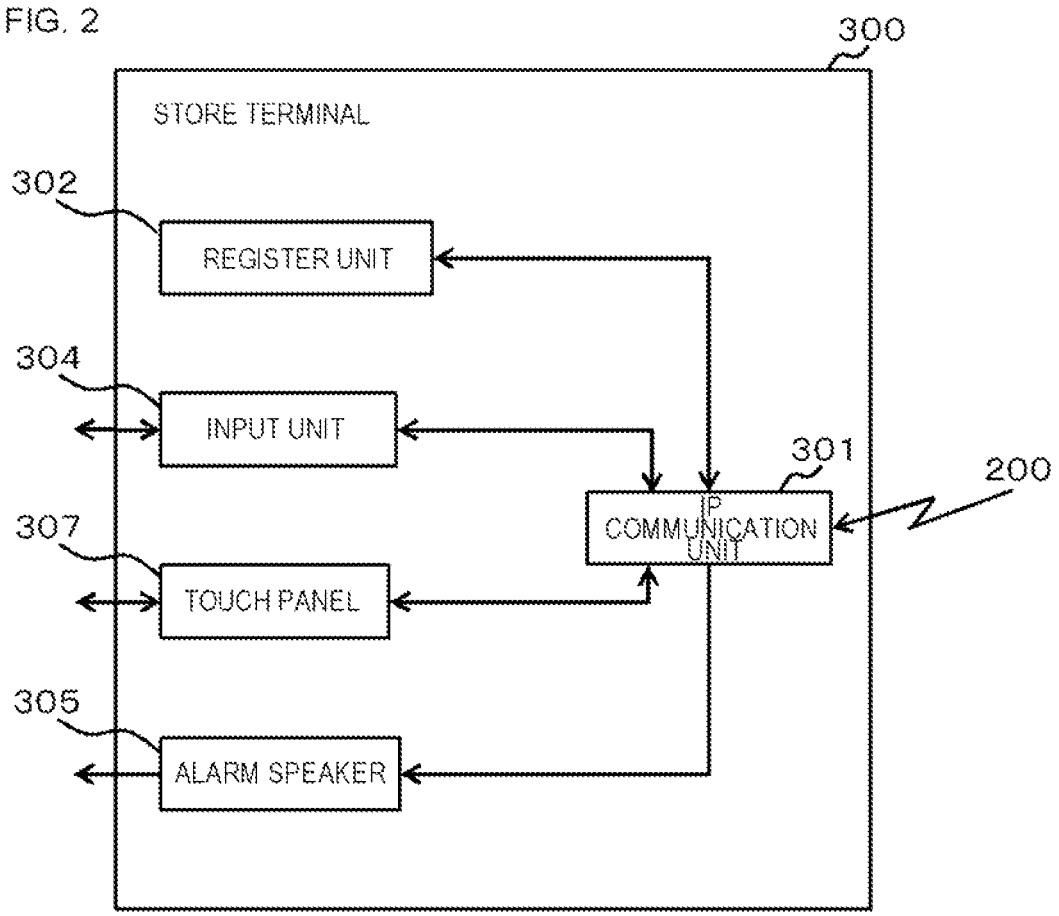
FIG. 2 is a functional block diagram illustrating a construction of a store terminal of the notification system shown in FIG. 1.

The notification system 1 of the present exemplary embodiment includes: an information processing terminal (store terminal 300) that is located at a work site (store S) and used for a predetermined site work process by a site worker (store clerk); an IP telephone terminal 400 that is located at the work site (store S) and used for IP phone call; and a management apparatus 100 that is connected to the store terminal 300 and the IP telephone terminal 400 via a network 3. The store terminal 300 includes a communication unit (IP communication unit 301 of FIG. 2) that communicates with the management apparatus 100 via the network 3; and a displaying unit (touch panel 307 of FIG. 2) that performs display processing controlled by the management apparatus 100 via the IP communication unit 301 (FIG. 2). The IP telephone terminal 400 includes a communication unit (IP communication unit 401 of FIG. 3) that communicates with the management apparatus 100 via the network 3; and a ringing unit (alarm speaker 405 of FIG. 3) that receives a call from the management apparatus 100 via the IP communication unit 401 (FIG. 3), and sounds the ring tone. The management apparatus 100 includes an interface unit 120 that communicates with the store terminal 300 and the IP telephone terminal 400 via the network 3; an accepting unit 102 that accepts an emergency notification to the site worker (store clerk); a display controlling unit 104 that communicates with the store terminal 300 via the interface unit 120 and allows the emergency notification accepted by the accepting unit 102 to be displayed and output on the touch panel 307 of the store terminal 300 (FIG. 2); and a calling unit 106 that communicates with the store terminal 300 via the interface unit 120 and calls the IP telephone terminal 400 to make the site worker (store clerk) recognize the emergency notification.

Specifically, the notification system 1 includes a management apparatus 100 and a plurality of store servers 200 that are connected to the management apparatus 100 via a network 3 such as the Internet, a WAN (Wide Area Network) or a LAN (Local Area Network) and respectively located at a plurality of stores Sa, Sb (In FIG. 2, only two stores are depicted. Hereafter, they will be abbreviated as "store S") that are managed by the management apparatus 100. Further, in each store S, the store server 200 includes an interface unit (I/F) 202 that communicates with the management apparatus 100 via the network 3, and is connected to at least one store terminal 300 and at least one IP telephone terminal 400 via a network 204 such as a LAN.

The management apparatus 100 and the store server 200 are server computers. The management apparatus 100 and the store server 200 are what are known as Session Initiation Protocol (SIP) servers, and realize various functions for the management apparatus 100 and the store server 200 by executing corresponding computer program CP (FIG. 4) that is mounted on a memory (not illustrated in the drawings).

Figure 4:
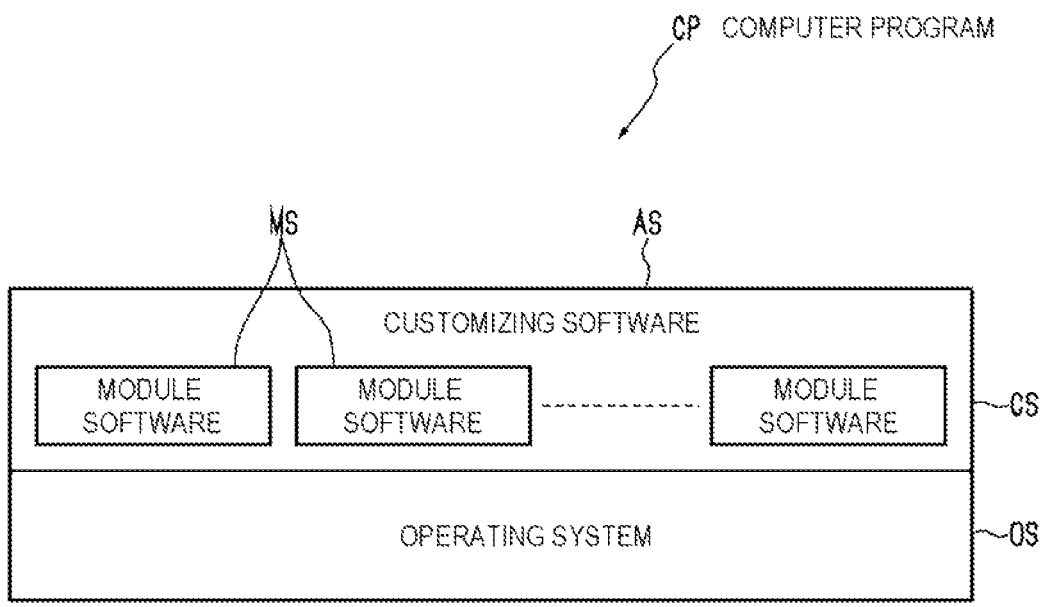
FIG. 4 is a model view illustrating a logic structure of a computer program of the notification system shown in FIG. 1.

As shown in FIG. 4, this computer program CP includes a general-use operating system OS that is not specialized to each store S and an application software AS corresponding to each store S.

This application software AS includes, for example, of module softwares MS such as various kinds of widgets that are prepared in advance by being specialized to respective specific functions, a customizing software CS such as an Application Programming Interface (API) that integrates these module softwares MS in correspondence with the desires of each store S, and the like.

Returning to FIG. 1, in the present exemplary embodiment, the store terminal 300 is, for example, what is known as a POS (Point Of Sales) terminal, and is located for each of the plurality of cashier units (not illustrated in the drawings) in the store. The IP telephone terminal 400 is an IP telephone set that is located at the same work site as the store terminal 300.

Here, in FIG. 1, the construction of the parts that will not be essentially related to the gist of the present invention and not be illustrated in the drawings.

Also, each of the constituent elements of the notification system 1 is realized by an arbitrary combination of hardware and software including, at the center thereof, a CPU of an arbitrary computer, a memory, a program that realizes the constituent elements of the present drawings and that is loaded on the memory, a storage unit such as a hard disk that stores the program, and an interface for connection to the network. Then, those skilled in the art will understand that there may be various modifications to the method of realization thereof, and the apparatus. Each of the drawings described in the following shows a block of a functional unit rather than the construction of a hardware unit.

The management apparatus 100 includes an accepting unit 102, a display controlling unit 104, a calling unit 106, a sound output controlling unit 108, a detecting unit 110, a recording unit 112, a history storing unit (which is denoted as "history" in the drawings) 114, and an interface unit (I/F) 120.

The interface unit 120 communicates with the store server 200 of each store S via the network 3. The accepting unit 102 accepts an emergency notification to the store S by operation input into an operation unit or the like that is not illustrated in the drawings. For example, the accepting unit 120 accepts input of various information such as designation of a store or a group to which the emergency notification should be issued, setting of an emergency level, input of the specific contents (object commercial products, contents, whether the products must be recalled or not) of the notification, and input of certification information. The emergency notification information that has been accepted by the accepting unit 102 is recorded to the history storing unit 114 by the recording unit 112.

Here, although not illustrated in the drawings, the management apparatus 100 includes a database that stores information of the store servers 200 of the plurality of stores S to be managed.

The display controlling unit 104 transmits the emergency notification that has been accepted by the accepting unit 102 to the store server 200 of each store S via the interface unit 120, and allows the emergency notification to be displayed and output on a touch panel 307 (FIG. 2) of the store terminal 300 described later. Here, the display controlling unit 104 may manage only the store server 200, instruct the store server 200 to perform the display and output of the emergency notification so that the store server 200 instructs the plurality of store terminals 300 under the management of the store server 200 to perform the display and output, or alternatively, the display controlling unit 104 may manage the plurality of store terminals 300 of each store S and control the display and output.

As shown in FIG. 5, in the present exemplary embodiment, an emergency notification screen 500 includes, for example, an emergency notification mark 502, a content displaying column 504, and a confirmation button 506. The emergency notification mark 502 is displayed conspicuously so that the store clerk of the store S immediately recognizes that the present screen is an emergency notification. It may be a blinking display or a moving picture. In the content displaying column 504, the contents of the emergency notification are described. The confirmation button 506 is operated after the store clerk of the store S confirms the emergency notification screen 500. By pressing the confirmation button 506 down, the emergency notification screen 500 may be closed after a confirmation screen. Also, the management apparatus 100 may be informed of the confirmation of the emergency notification via the store server 200.

Returning to FIG. 1, the calling unit 106 transmits the emergency notification accepted by the accepting unit 102 to the store server 200 of each store S via the interface unit 120, and calls a later-described IP telephone terminal 400 via the store server 200. Here, the calling unit 106 may manage only the store server 200 and instruct the store server 200 so that the store server 200 calls a plurality of IP telephone terminals 400 that are under the management of the store server 200. Alternatively, the calling unit 106 may manage and directly call the plurality of IP telephone terminals 400 of each store S. As will be described later, when called, the IP telephone terminal 400 can receive a call and then sound the ring tone so as to inform the store clerk.

The sound output controlling unit 108 allows a sound message to be output to the IP telephone terminal 400 by sound when the store clerk of the store S or the like makes a response at each IP telephone terminal 400 that the calling unit 106 has called. For example, the sound output controlling unit 108 may allow a notification message of "This is an emergency notification." that notifies that an emergency notification has been issued, an instruction message of "This is an emergency notification. Look at the screen." that prompts the clerk to look at the screen because the emergency notification has been issued, an emergency message of "This is an emergency notification. Quickly recall the commercial products A." that transmits the contents themselves of the emergency notification, or the like to be output by sound.

The detecting unit 110 detects whether the site worker (store clerk) has responded to the calling of the emergency notification to the IP telephone terminal 400. The detecting unit 110 may make an inquiry to the store server 200 of each store S via the interface unit 120 or may receive notification from the store server 200 of each store S.

As described above, the recording unit 112 records the emergency notification information accepted by the accepting unit 102 to the history storing unit 114, and records to the history storing unit 114 a detection result of each store S detected by the detecting unit 110 as to whether the calling of the emergency notification has been responded to or not.

The history storing unit 114 stores, for example, date and time of the receipt, a code of the store or group serving as an object of notification, an emergency level, contents, whether the certification has been successfully made or not, the situation of notification confirmation for each store, date and time of repeated notification, and the like as the emergency notification information accepted by the accepting unit 102.

The management apparatus 100 of the present exemplary embodiment executes various processing operations in accordance with the computer program mounted as described above, and whereby various units 102 to 120 such as described above are realized as various functions.

The computer program according to the present exemplary embodiment is a program for allowing a computer to realize a notification apparatus (management apparatus 100) that communicates with an information processing terminal (store terminal 300) used for a predetermined site work process by a site worker (store clerk) and an IP telephone terminal (IP telephone terminal 400) used for IP phone call, which are located at one work site, wherein the program is described so as to allow the computer to execute: a reception procedure by which the management apparatus 100 accepts an emergency notification to the site worker (store clerk); an emergency displaying procedure by which the management apparatus 100 displays and outputs the accepted emergency notification on the store terminal 300; and an emergency calling procedure by which the management apparatus 100 calls the IP telephone terminal 400 to make the site worker (store clerk) recognize the emergency notification.

As illustrated in FIG. 2, in the present exemplary embodiment, the store terminal 300 includes an IP communication unit 301, a register unit 302, an input unit 304, an alarm speaker 305, and a touch panel 307.

A microcomputer is incorporated into the IP communication unit 301, and integrates and controls each of the units such as the register unit 302, the input unit 304, the alarm speaker 305, and the touch panel 307 in accordance with the computer program on a mounted memory (not illustrated in the drawings).

The register unit 302 is a unit that obtains and sums up the commercial product information from a bar code of a commercial product read by the input unit 304 at the time of selling the commercial product, and performs a settlement process and the like. It is not related to the essentials of the present invention, however, so that the detailed description thereof will not be given.

The input unit 304 includes, not be particularly limited to, a reading unit that reads commercial product information from a bar code or a Radio Frequency Identification (RFID) tag attached to the commercial product and an operation accepting unit such as an operation key, a keyboard, an operation button, a switch, a jog dial, or a touch pad that accepts an operation of the store clerk. The input unit 304 accepts the commercial product information or the input operation that the reading unit or the operation accepting unit has accepted, and transmits it to the IP communication unit 301.

The touch panel 307 may be with respect to the displaying function, not be particularly limited to, for example, a liquid crystal display, a plasma display, an organic Electroluminescence (EL) display, or the like. The touch panel 307 may accept with respect to the operation accepting function, not be particularly limited to, an operation by a finger of a user, an operation using a touch pen, or a combination of these.

In the present exemplary embodiment, when an emergency notification is issued from the management apparatus 100, an emergency notification screen 500 is displayed in pop-up on the touch panel 307 of the store terminal 300. This pop-up display is displayed more preferentially than any other screen and, in the event that a plurality of screens are displayed, this pop-up screen is displayed on the topmost surface.

Figure 3:
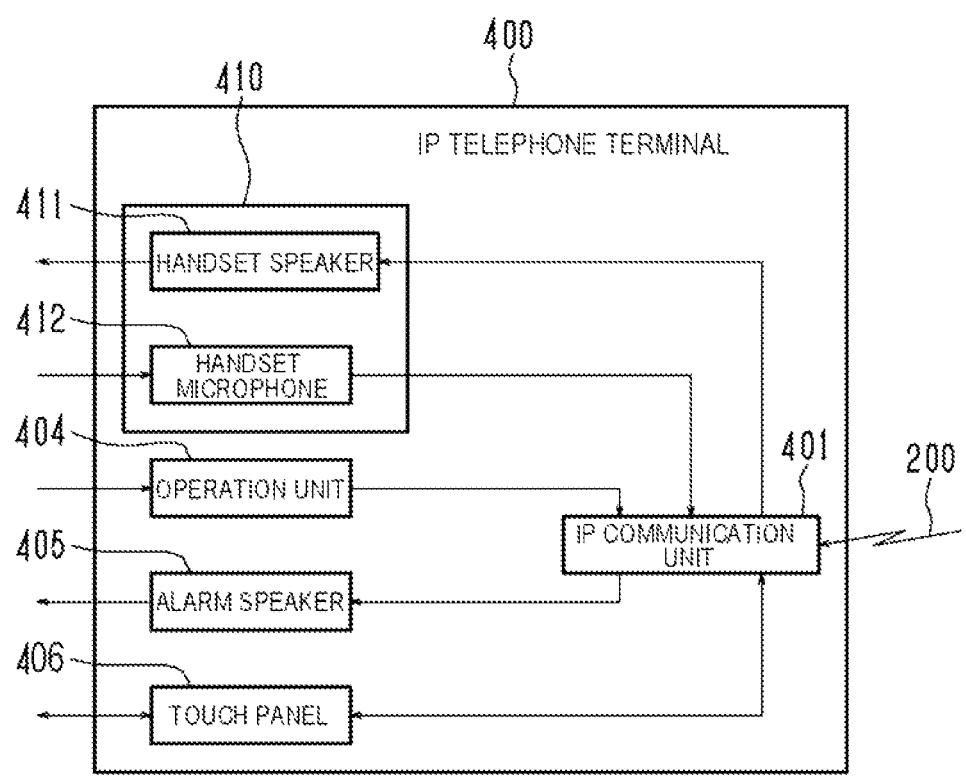
FIG. 3 is a functional block diagram illustrating a construction of an IP telephone terminal of the notification system shown in FIG. 1.

As shown in FIG. 3, in the present exemplary embodiment, the IP telephone terminal 400 includes an IP communication unit 401, a handset unit 410, an operation unit 404, an alarm speaker 405, and a touch panel 406.

A microcomputer is incorporated into the IP communication unit 401, and integrates and controls each of the units such as the handset unit 410, the operation unit 404, the alarm speaker 405, and the touch panel 406 in accordance with the computer program on a mounted memory (not illustrated in the drawings).

The handset unit 410 has a handset speaker 411 and a handset microphone 412. For example, the handset unit 410 may be a unit that can be removed from a main body of the IP telephone terminal 400 as a construction capable of wireless communication with the IP telephone terminal 400. The user such as a site worker, for example, a store clerk of a store in the present exemplary embodiment may make a phone call over the IP telephone terminal 400 using the handset speaker 411 and the handset microphone 412 of the handset unit 410.

The operation unit 404 includes, not be particularly limited to, an operation key, an operation button, a switch, a jog dial, a touch pad, or the like that accepts an input operation of a telephone number or other operations and after accepting these operations, transmits them to the IP communication unit 401. The alarm speaker 405, for example, outputs a calling sound at the time of receiving a call, and outputs a received voice. In the present exemplary embodiment, when a call from the management apparatus 100 is received, a ring tone is rung from the alarm speaker 405.

The touch panel 406 may be with respect to the displaying function, not be particularly limited to, for example, a liquid crystal display, a plasma display, an organic EL display, or the like. The touch panel 406 may accept with respect to the operation accepting function, not be particularly limited to, an operation by a finger of a user, an operation using a touch pen, or a combination of these.

Hereafter, a method of operating a notification apparatus in the notification system 1 of the present exemplary embodiment constructed as shown above will be described. FIG. 6 is a flowchart showing an example of an operation of the notification system 1 of the present exemplary embodiment.

The method of the present exemplary embodiment is a method of operating a notification apparatus (management apparatus 100) that communicates with an information processing terminal (store terminal 300) used for a predetermined site work process by a site worker (store clerk) and an IP telephone terminal 400 used for IP phone call, which are located at one work site (store S). The method includes: making the management apparatus 100 accept an emergency notification to the site worker (store clerk) (YES of step S101); making the management apparatus 100 display and output the accepted emergency notification on the store terminal 300 (step S103); and making management apparatus 100 call the IP telephone terminal 400 to make the site worker (store clerk) recognize the emergency notification (step S105).

Specifically, in the management apparatus 100, the accepting unit 102 accepts an emergency notification (YES of step S101). The accepting unit 102 allows the recording unit 112 to record the emergency notification information to the history storing unit 114, and instructs the display controlling unit 104 and the calling unit 106 to issue a notification.

In the management apparatus 100, the display controlling unit 104 allows the store server 200 of the store serving as an object of notification to display and output the emergency notification via the network 3 (step S103). The store server 200 receives the emergency notification from the management apparatus 100 and allows the touch panel 307 of the store terminal 300 to perform pop-up display of the emergency notification screen 500 for the emergency notification (step S201).

Further, in the management apparatus 100, the calling unit 106 instructs the store server 200 of the store serving as an object of notification to call the IP telephone terminal 400 via the network 3 (step S105). The store server 200 receives the calling instruction of the emergency notification from the management apparatus 100 and calls the IP telephone terminal 400, so that the IP telephone terminal 400 receives the call and sounds the ring tone through the alarm speaker 405 (step S203). By this, the store clerk of the store S can immediately notice the ring tone and take a procedure of responding over the IP telephone terminal 400.

The store clerk that has responded over the IP telephone terminal 400, for example, hears the notification message from the alarm speaker 405 of the IP telephone terminal 400, looks at the touch panel 307 of the store terminal 300 that is located at the same work site, and confirms the emergency notification screen 500 (FIG. 5). When the store clerk has responded over the IP telephone terminal 400, in the management apparatus 100, the detecting unit 110 detects that the IP telephone terminal 400 has responded to the calling of the emergency notification (YES of step S107), and the recording unit 112 records the date and time of the confirmation and the like to the history storing unit 114 (step S109).

Here, although not illustrated in the drawings, when no response has been made for more than a predetermined period of time to the calling by the emergency notification of the IP telephone terminal 400, the calling by the calling unit 106 is stopped, and the recording unit 112 records that there has been no response to the history storing unit 114.

As described above, the notification system 1 of the present exemplary embodiment can allow the store clerk to notice the emergency notification promptly and with certainty by allowing the store terminal 300 that the store clerk of the store uses to perform a pop-up display output of the message of the emergency notification, by calling the IP telephone terminal 400 that is used on the side of the store terminal 300, and by ringing. Thus, the store clerk can notice the notification outstandingly easily as compared with the case of using only the pop-up display.

Also, a case in which the store terminal 300 outputs an alarm sound may be considered. However, in the case of the store terminal 300 placed in the store, there is a possibility that the volume of the speaker is adjusted and lowered on the store side, leaving a fear that the store clerk may not notice the alarm sound.

By using the IP telephone terminal 400, in addition to ringing, when the store clerk has answered the call, a sound massage telling the presence or absence of the message of the emergency notification and a content itself of the message of the emergency notification can be output by sound thereby transmitting the message to the store clerk.

The notification system 1 of the present exemplary embodiment can be easily constructed by newly introducing the IP telephone terminal 400 to the store system using an existing POS terminal. As shown in FIG. 4, it can be easily realized by being incorporated into an application software AS as a module software MS or a customizing software CS constituting the present notification system 1.

Also, the notification system 1 of the present exemplary embodiment can be applied, for example, to a food distribution site where various kinds of boxed meals are produced from a food processing factory such as prepared daily dishes and sold at a convenience store or a shop. For example, in the event that any problem has been found in the source material of the food and the food must be recalled urgently, the notification system 1 of the present exemplary embodiment can issue an instruction of recalling the commercial product as an object of recall to each store to be recalled promptly and with certainty.

As shown above, the exemplary embodiments of the present invention have been described. However, these are exemplifications of the present invention, so that one can adopt various constructions other than those described above.

For example, in another exemplary embodiment, the IP telephone terminal 400 may include a reading apparatus (not illustrated in the drawings) that reads the certification information of the user (store clerk) of a medium for user certificate, and the certification information of the medium for user certificate of the site worker (store clerk) is read in accordance with the calling of the emergency notification and transmitted to the management apparatus 100 via the store server 200. The management apparatus 100 may include a receiving unit (not illustrated in the drawings) that receives the certification information of the site worker (store clerk) that has responded to the calling to the IP telephone terminal 400 from the IP telephone terminal 400 via the interface unit 120 and a certification unit (not illustrated in the drawings) that certifies the site worker (store clerk) based on the certification information of the site worker (store clerk).

Further, the recording unit 112 of the management apparatus 100 records to the history storing unit 114 that the site worker (store clerk) has not responded to the calling of the emergency notification at the work site when the site worker (store clerk) has not been certified by the certification unit. Further, recording unit 102 records to the history storing unit 114 the certified site worker (store clerk) as the site worker (store clerk) that has responded to the calling of the emergency notification at the work site when the site worker (store clerk) has been certified by the certification unit.

The medium for user certificate may be a magnetic card, an ID card, an RFID tag, or the like. Alternatively, it may be a biometric authentication, so that various modes such as a fingerprint, a vein, an iris, and a face are may be considered.

With this construction, the site worker (store clerk) that has responded to the IP telephone terminal 400 and recognized the emergency notification can be identified, and whereby the site worker (store clerk) that confirms the emergency notification may possibly confirm the contents of the emergency notification with responsibility. Also, when a person other than the person in charge or an outsider has confirmed the emergency notification, the output of the emergency notification can be continued until the person in charge confirms the emergency notification, so that the emergency notification can be transmitted to the person in charge with certainty.

Further, the management apparatus 100 may further include a controlling unit (not illustrated in the drawings) that allows the calling unit 106 to call the IP telephone terminal 400 with respect to a work site at which it is recorded that there is no response to the emergency notification by the site worker (store clerk) by making reference to the history information recorded in the history storing unit 114.

With this construction, with respect to a store S that has not responded to the calling of the emergency notification, the calling unit 106 may be made to call the IP telephone terminal 400 repetitively, for each store S.

Also, in the management apparatus 100, the above controlling unit may allow the display controlling unit 104 to display and output the emergency notification again on the store terminal 300 of the store S.

Further, the detecting unit 110 may receive not only the response of the IP telephone terminal 400 but also the confirmation notification of the emergency notification by an operation of the confirmation button 506 of the emergency notification screen 500 displayed on the touch panel 307 of the store terminal 300, and allow the recording unit 112 to record them to the history storing unit 114.

Here, in the above-described exemplary embodiment, a construction has been given in which the message of the emergency notification is popped up on the displaying unit (touch panel 307) of the information processing terminal (store terminal 300); however, the present invention is not limited thereto. For example, the IP telephone terminal 400 may have a displaying unit (touch panel 406) having a screen size capable of displaying a message, and the display controlling unit 104 of the management apparatus 100 may allow the touch panel 406 of the IP telephone terminal 400 to display and output a message of an emergency notification. Alternatively, the display controlling unit 104 of the management apparatus 100 may allow the displaying unit (not illustrated in the drawings) of the store server 200 to display and output a message of an emergency notification.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A notification apparatus comprising:
a terminal communication unit that communicates with an information processing terminal used for a predetermined site work process by a site worker and an Internet Protocol (IP) telephone terminal used for IP phone call, which are located at one work site;
an accepting unit that accepts an emergency notification to said site worker;
an emergency displaying unit that displays and outputs said accepted emergency notification on said information processing terminal via said terminal communication unit;
an emergency calling unit that calls said IP telephone terminal via said terminal communication unit to make said site worker recognize said emergency notification;
a receiving unit that receives certification information of said site worker that has responded to the calling of said emergency notification to said IP telephone terminal; and
a certification unit that certifies said site worker based on said certification information of said site worker,
wherein said receiving unit receives the certification information of the site worker that is read from a medium recording the certification information of the site worker thereon, or a biological body of the site worker and then transmitted by using the IP telephone terminal.

2. The notification apparatus as set forth in claim 1, further comprising a detecting unit that detects whether said site worker has responded or not to the calling of said emergency notification to said IP telephone terminal.

3. The notification apparatus as set forth in claim 2, wherein said emergency calling unit allows a notification message for notifying said site worker of said emergency notification to be output by sound to said IP telephone terminal when said site worker has responded to the calling of said emergency notification to said IP telephone terminal.

4. The notification apparatus as set forth in claim 2, wherein said emergency calling unit allows a notification message for communicating a content of said emergency notification to the said worker to be output by sound to said IP telephone terminal when said site worker has responded to the calling of said emergency notification to said IP telephone terminal.

5. The notification apparatus as set forth in claim 4, further comprising a recording unit that records, for each of said work site, a detection result of whether said site worker has responded to the calling of said emergency notification to said IP telephone terminal in said detecting unit.

6. The notification apparatus as set forth in claim 5, wherein said recording unit records that said site worker has not responded to the calling of said emergency notification at the work site when said site worker has not been certified by said certification unit, and
records said certified site worker as the site worker that has responded to the calling of said emergency notification at the work site when said site worker has been certified by said certification unit.

7. The notification apparatus as set forth in claim 5, further comprising a controlling unit that allows said emergency calling unit to call said IP telephone terminal via said terminal communication unit with respect to a work site at which it is recorded that there is no response to said emergency notification by said site worker by making reference to said recording unit.

8. A notification system comprising:
an information processing terminal that is located at a work site and used for a predetermined site work process by a site worker;
an IP telephone terminal that is located at said work site and used for IP phone call; and
a management apparatus that is connected to said information processing terminal and said IP telephone terminal via a network,
wherein said information processing terminal includes:
a communication unit that communicates with said management apparatus via said network; and
a displaying unit that performs display processing controlled by said management apparatus via said communication unit,
said IP telephone terminal includes:
a communication unit that communicates with said management apparatus via said network; and
a ringing unit that receives a call from said management apparatus via said communication unit, and sounds the ring tone, and
said management apparatus comprises:
a communication unit that communicates with said information processing terminal and said IP telephone terminal via said network;
an accepting unit that accepts an emergency notification to said site worker;
an emergency displaying unit that communicates with said information processing terminal via said communication unit and allows said emergency notification accepted by said accepting unit to be displayed and output on said displaying unit of said information processing terminal; and
an emergency calling unit that communicates with said information processing terminal via said communication unit and calls said IP telephone terminal to make said site worker recognize said emergency notification;
a receiving unit that receives certification information of said site worker that has responded to the calling of said emergency notification to said IP telephone terminal; and
a certification unit a certifies said site worker based on said certification information of said site worker,
wherein said receiving unit receives the certification information of the site worker that is read from a medium recording the certification of a of the site worker thereon, or a biological body of the site worker and then transmitted by using the IP telephone terminal.

9. The notification system as set forth in claim 8, wherein said management apparatus further comprises a detecting unit that detects whether said site worker has responded or not to the calling of said emergency notification to said IP telephone terminal.

10. The notification system as set forth in claim 9, wherein said emergency calling unit of said management apparatus allows a notification message for notifying said site worker of said emergency notification to be output by sound to said IP telephone terminal when said site worker has responded to the calling of said emergency notification to said IP telephone terminal.

11. The notification system as set forth in claim 9, wherein said emergency calling unit of said management apparatus allows a notification message for communicating a content of said emergency notification to said site worker to be output by sound to said IP telephone terminal when said site worker has responded to the calling of said emergency notification to said IP telephone terminal.

12. The notification system as set forth in claim 11, wherein said management apparatus further comprises a recording unit that records, for each of said work site, a detection result of whether said site worker has responded to the calling of said emergency notification to said IP telephone terminal in said detecting unit.

13. The notification system as set forth in claim 12, wherein said recording unit of said management apparatus records that said site worker has not responded to the calling of said emergency notification at the work site when said site worker has not been certified by said certification unit, and records said certified site worker as the site worker that has responded to the calling of said emergency notification at the work site when said site worker has been certified by said certification unit.

14. The notification system as set forth in claim 12, wherein said management apparatus further comprises a controlling unit that allows said emergency calling unit to call said IP telephone terminal with respect to a work site at which it is recorded that there is no response to said emergency notification by said site worker by making reference to said recording unit.

15. A method of operating a notification apparatus that communicates with an information processing terminal used for a predetermined site work process by a site worker and an IP telephone terminal used for IP phone call, which are located at one work site, including:
making said notification apparatus accept an emergency notification to said site worker;
making said notification apparatus display and output said accepted emergency notification on said information processing terminal;
making said notification apparatus call said IP telephone terminal to make said site worker recognize said emergency notification;
making said notification apparatus receive certification information of said site worker that has responded to the calling of said emergency notification to said IP telephone terminal; and
making said notification apparatus certify said site worker based on said certification information of said site worker,
wherein said notification apparatus receives the certification information of the site worker that is read from a medium recording the certification information of the site worker thereon, or a biological body of the site worker and then transmitted by using the IP telephone terminal.

16. A program for allowing a computer to realize a notification apparatus that communicates with an information processing terminal used for a predetermined site work process by a site worker and an IP telephone terminal used for IP phone call, which are located at one work site,
wherein the program allows said computer to execute:
a reception procedure by which said notification apparatus accepts an emergency notification to said site worker;
an emergency displaying procedure by which said notification apparatus displays and outputs said accepted emergency notification on said information processing terminal;
an emergency calling procedure by which said notification apparatus calls said IP telephone terminal to make said site worker recognize said emergency notification
a receiving procedure by which said notification apparatus receives certification information of said site worker that has responded to the calling of said emergency notification to said IP telephone terminal; and
a certification procedure by which said notification apparatus certifies said site worker based on said certification information of said site worker,
wherein said the notification apparatus receives the certification information of the site worker that is read from a medium recording the certification information of the site thereon, or a biological body of the site worker and then transmitted by using the IP telephone terminal.

17. A notification apparatus comprising:
a terminal communication means for communicating with an information processing terminal used for a predetermined site work process by a site worker and an IP telephone terminal used for IP phone call, which are located at one work site;
an accepting means for accepting an emergency notification to said site worker;
an emergency displaying means for displaying and outputting said accepted emergency notification on said information processing terminal via said terminal communication means;
an emergency calling means for calling said IP telephone terminal via said terminal communication unit to make said site worker recognize said emergency notification;
a receiving means for receiving certification information of said site worker that has responded to the calling of said emergency notification to said IP telephone terminal; and
a certification means for certifying said site worker based on said certification information of said site worker.
wherein the certification information of the site worker that is read from a medium recording the certification information of the site worker thereon, or a biological body of the site worker and then transmitted by using the IP telephone terminal.

18. A notification system comprising:
an information processing terminal that is located at a work site and used for a predetermined site work process by a site worker;
an IP telephone terminal that is located at said work site and used for IP phone call; and
a management apparatus that is connected to said information processing terminal and said IP telephone terminal via a network,
wherein said information processing terminal includes:
a communication means for communicating with said management apparatus via said network; and
a displaying means for performing display processing controlled by said management apparatus via said communication means,
said IP telephone terminal includes:
a communication means for communicating with said management apparatus via said network; and
a ringing means for receiving a call from said management apparatus via said communication means, and sounds the ring tone, and
said management apparatus comprises:
a communication means for communicating with said information processing terminal and said IP telephone terminal via said network;

an accepting means for accepting an emergency notification to said site worker;

an emergency displaying means for communicating with said information processing terminal via said communication unit, and allowing said emergency notification accepted by said accepting means to be displayed and output on said displaying means of said information processing terminal;

an emergency calling means for communicating with said information processing terminal via said communication means, and calling said IP telephone terminal to make said site worker recognize said emergency notification;

a receiving means for receiving certification information of said site worker that has responded to the calling of said emergency notification to said IP telephone terminal; and a certification means for certifying said site worker based on said certification information of sa site worker, wherein the certification information of the site worker that is read from a medium recording the certification information of the site worker thereon, or a biological body of the site worker and then transmitted by using the IP telephone terminal.

* * * * *